(12) United States Patent
Saarela

(10) Patent No.: US 11,114,887 B2
(45) Date of Patent: Sep. 7, 2021

(54) POWER SYSTEM FOR VERTICAL TRANSPORTATION, METHOD AND VERTICAL TRANSPORTATION ARRANGEMENTS

(71) Applicant: Kone Corporation, Helsinki (FI)

(72) Inventor: Sami Saarela, Helsinki (FI)

(73) Assignee: Kone Corporation, Helsinki (FI)

( * ) Notice: Subject to any disclaimer, the term of this patent is extended or adjusted under 35 U.S.C. 154(b) by 189 days.

(21) Appl. No.: 16/110,544

(22) Filed: Aug. 23, 2018

(65) Prior Publication Data
US 2019/0067981 A1 Feb. 28, 2019

(30) Foreign Application Priority Data
Aug. 24, 2017 (EP) ..................................... 17187617

(51) Int. Cl.
| | | |
|---|---|---|
| *B60L 1/00* | (2006.01) | |
| *B60L 3/00* | (2019.01) | |
| *H02J 7/14* | (2006.01) | |
| *B66B 11/04* | (2006.01) | |
| *B66B 23/02* | (2006.01) | |
| *B66B 9/00* | (2006.01) | |

(Continued)

(52) U.S. Cl.
CPC .................. *H02J 7/14* (2013.01); *B66B 1/30* (2013.01); *B66B 5/027* (2013.01); *B66B 9/00* (2013.01); *B66B 11/043* (2013.01); *B66B 23/02* (2013.01)

(58) Field of Classification Search
CPC . H02J 7/14; B66B 5/027; B66B 1/302; B66B 1/28
See application file for complete search history.

(56) References Cited

U.S. PATENT DOCUMENTS

| | | | |
|---|---|---|---|
| 6,732,838 B1* | 5/2004 | Okada ....................... | B66B 1/30 |
| | | | 187/290 |
| 2001/0017237 A1* | 8/2001 | Tominaga ................. | B66B 1/30 |
| | | | 187/290 |

(Continued)

FOREIGN PATENT DOCUMENTS

| | | |
|---|---|---|
| WO | WO-2010/019123 A1 | 2/2010 |
| WO | WO-2010/020705 A1 | 2/2010 |

OTHER PUBLICATIONS

European Search Report for European Application No. 17 187 617.0 dated Feb. 15, 2018.

*Primary Examiner* — Hal Kaplan
*Assistant Examiner* — Rasem Mourad
(74) *Attorney, Agent, or Firm* — Harness, Dickey & Pierce, P.L.C.

(57) ABSTRACT

The current disclosure relates to a power system for feeding power into a vertical transportation arrangement. The power system comprises a first interface for connecting to a primary power source; a second interface for connecting to a secondary power source; and power controlling means for controlling feeding of power from the primary power source and/or the secondary power source to a motor for driving a vertical transportation device. The power system is characterized in that the power controlling means is configured to control feeding at least some of the power used by the motor during normal operation from the secondary power source. The current disclosure also relates to a method and vertical transportation arrangements.

21 Claims, 1 Drawing Sheet

(51) Int. Cl.
*B66B 1/30* (2006.01)
*B66B 5/02* (2006.01)

(56) References Cited

U.S. PATENT DOCUMENTS

| | | | | |
|---|---|---|---|---|
| 2011/0120811 | A1* | 5/2011 | Kallioniemi | B66B 1/302 187/382 |
| 2011/0139547 | A1* | 6/2011 | Veronesi | B66B 1/302 187/247 |
| 2011/0139550 | A1* | 6/2011 | Veronesi | B66B 5/027 187/290 |
| 2012/0010751 | A1* | 1/2012 | Kallioniemi | B66B 1/302 700/275 |
| 2014/0327306 | A1* | 11/2014 | Inoue | H02J 7/022 307/23 |
| 2015/0203328 | A1* | 7/2015 | Horbrugger | H02J 7/0068 187/290 |
| 2016/0229666 | A1* | 8/2016 | Gewinner | B66B 1/302 |

* cited by examiner

POWER SYSTEM FOR VERTICAL TRANSPORTATION, METHOD AND VERTICAL TRANSPORTATION ARRANGEMENTS

CROSS-REFERENCE TO RELATED APPLICATIONS

This application claims priority under 35 U.S.C. § 119 to, European Application No. 171876170, filed Aug. 24, 2017, in the European Patent Office, the entire contents are hereby incorporated by reference.

TECHNICAL FIELD

Present disclosure relates to a power system for feeding power into a vertical transportation arrangement. The disclosure further relates to a method of feeding power into a motor driving a vertical transportation arrangement.

BACKGROUND ART

Vertical transportation devices, such as elevators and escalators are driven by electric motors that receive their power typically from electrical network. The power usage needed to move a single elevator car, for example, varies depending on the movement phase it is in. Maximum power is needed when a fully-loaded elevator car is accelerated upwards from the lowest landing, or when an empty car is accelerated downwards from the topmost floor. During steady-speed drive the power usage is lower. Commonly, a number of elevator cars are connected to an elevator group. The power usage of an elevator group comprising at least two elevators fluctuates depending on if all elevator cars are in use at a given point in time, in which phase of movement they are in and how fully loaded they are.

It is possible that electrical network feeding energy to the vertical transportation arrangement is not able to provide enough power during peak power consumption. It is known in the art to limit the power usage of vertical transportation arrangements by setting upper threshold values to elevator acceleration speed and/or running speed. Also, in elevator groups comprising at least two elevators, it is known to allocate calls so that only one elevator car at a time is moving, if energy availability is lowered. For example, in document WO 2010020705, an elevator system comprising an energy storage is disclosed.

Prior art solutions have the drawback that the optimum acceleration or running speed of the vertical transportation devices may be compromised in situations of low energy availability or heavy use of the vertical transportation arrangement.

The inventors have therefore recognized the need for an improved power system for vertical transportation arrangements.

SUMMARY

An object of the present disclosure is to alleviate problems related to prior art. More specifically, it is the object of the present disclosure to decrease the dependency of a vertical transportation arrangement on steady or sufficiently high availability of energy through the electricity network. It is a further object of the present disclosure to provide a power system for vertical transportation arrangements which allows all the vertical transportation devices in the system to be driven at or close to their optimum speeds under variable conditions.

At least two situations for using the current power system can be envisaged. First, situations in which the power availability is limited. The limitation may be either periodical (only during peak consumption) or constant. The reasons may vary, ranging from outdated energy network in the building, expansion of the vertical transportation arrangement to problems in electricity supply. Second, the current power supply may allow the optimization of energy consumption through storing energy when it is advantageous. This can be done utilizing smart grids, for example.

In modernization of elevators, the existing power supply of the building is often limited, therefore not allowing upgrading of the elevator to a one with improved performance characteristics, but requiring more input power.

The current power system and the method of feeding power into a motor driving a vertical transportation device are in particular, but not only, intended for elevators, especially for passenger or cargo elevators of buildings. The current power system and the method of feeding power into a motor driving a vertical transportation device are also suited to escalator arrangements and to inclined moving walk arrangements, as well as to vertical transportation arrangements comprising different types of vertical transportation devices, such as elevators, escalators and inclined moving walks.

Example embodiments relate to a power system, a method of controlling the same, an elevator arrangement, an escalator arrangement, an inclined moving walk arrangement, and/or a vertical transportation system including more than one type of vertical transportation device.

The power system according to the present disclosure and the method of feeding power into a motor driving a vertical transportation device, as well as an elevator arrangement, an escalator arrangement, an inclined moving walk arrangement and a vertical transportation arrangement comprising more than one type of vertical transportation device can offer at least one of the following advantages over prior art.

The dependency on the steady availability of electricity at a level enough to operate the vertical transportation arrangement on an optimum level is reduced. Another advantage is that the vertical transportation arrangement can be driven at an optimum speed also during traffic peaks and/or during times of lower energy availability from the electrical network. A further advantage is that power availability might be less relevant for allocating calls in an elevator group comprising at least two elevators.

Also, when a vertical transportation arrangement of an existing building is upgraded, the building's electricity network may limit the maximum power available to the vertical transportation arrangement. Thus, the current power system, method and vertical transportation arrangements may allow using faster and thus more energy consuming vertical transportation without upgrading the building's electricity network.

An advantage is also that the fuse size of a vertical transportation arrangement may be reduced. For example the reduction of 20-50% might be attainable. This could lead to reduction in price and space requirements. For example, the smaller fuse size allows for designing the power supply devices, connectors, cabling etc. for a lower current, making them smaller and therefore lowering their price. The fuse size is also often a relevant factor in determining the electricity transmission price, which can be lowered by reducing fuse size. It may further be possible to reduce the electricity costs of the vertical transportation arrangement, because timing of electricity intake from the electricity network can be selected based on low electricity price.

Thus, it is possible to optimize the functioning of a vertical transportation arrangement based on efficiency and passenger comfort in situations, in which these parameters have previously been compromised.

An advantage of the current power system is that information provided by smart grids can be used to store energy at times when it is economically or environmentally advantageous.

By a vertical transportation arrangement is herein meant an arrangement comprising at least one vertical transportation device. By a vertical transportation device is herein meant an elevator or an escalator or an inclined moving walk. A vertical transportation arrangement and a device in the meaning of the current disclosure refer to an arrangement and a device, respectively, in which people or goods are transported and the movement comprises a vertical element. For example elevators may move directly vertically (i.e. perpendicularly to horizontal), or their movement can be inclined (slanted elevators, hill trams etc.).

The current power system may be implemented at new installations, or it can be retrofitted to existing installations during modernization. The building's existing internal electricity distribution system might limit the possibility of increasing the transport capacity, acceleration or speed of the vertical transportation devices in modernization cases. The current power system allows exceeding the power supply capacity of the building because the necessary extra power can be taken from the secondary power source and used to supply the necessary extra power. It is possible that the extra energy is only necessary during an acceleration phase of an elevator car or, if the vertical transport system comprises more than one device, only when two or more devices are simultaneously used. This avoids the expensive upgrading of the building's energy distribution system while allowing the vertical transportation arrangements to be modernized to its full capacity.

BRIEF DESCRIPTION OF DRAWINGS

The accompanying drawings, which are included to provide a further understanding of the disclosure and constitute a part of this specification, illustrate embodiments and together with the description help to explain the principles of the invention but the invention is not limited to the specific embodiments illustrated in the drawings. In the drawings.

DETAILED DESCRIPTION

Figure 1:
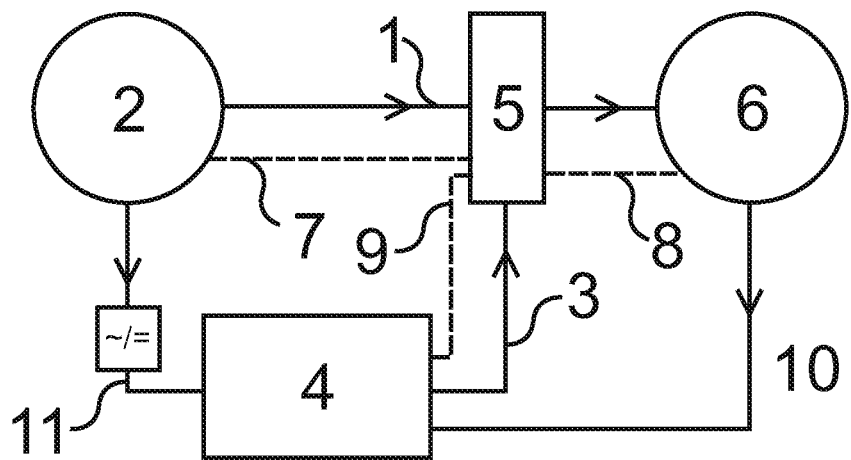
FIG. 1 presents an embodiment of the power system according to the present disclosure.

In one aspect, a power system for feeding power into a vertical transportation arrangement is disclosed. The power system comprises a first interface for connecting to a primary power source; a second interface for connecting to a secondary power source; power controlling means for controlling feeding of power from the primary power source and/or the secondary power source to a motor driving a vertical transportation device. The power system is characterized in that the power controlling means is configured to control feeding at least some of the power used by a motor during normal operation from the secondary power source.

In another aspect, a method of feeding power into a motor driving a device in a vertical transportation arrangement is disclosed. Power is fed into the motor by a primary power source and a secondary power source. The method is characterized in that the secondary power source provides at least some of the power used by the transportation system during normal operation.

The current power system feeds power to a vertical transportation arrangement. The vertical transportation arrangement may comprise, for example, a single elevator, two or more elevators (i.e. an elevator group) or a combination of one or more elevators and one or more escalators.

The vertical transportation devices, i.e. elevator, escalator or an inclined moving walk receive their energy from a primary power source, which is typically an electricity network. Alternatively, the primary power source may be a local energy source, such as a power generator or a solar cell.

The current power system comprises a first interface for connecting to the primary power source. The electricity is thus received from the primary power source through the first interface.

The power system also comprises a second interface for connecting to a secondary power source. The secondary power source may be a power storage. The power storage may be a battery. The secondary power source may be a group of batteries. In case the secondary power source is a group of batteries, the batteries may be located in one location or dispersed. Typically, a battery or a group of batteries would be located near the motor or the drive of the vertical transportation arrangement. In cases where the vertical transportation arrangement comprises more than one vertical transportation device, a battery or a group of batteries can be located near the motor of each device, or at a central location. Alternatively, the second power source may be a local energy source, such as a power generator or a solar cell. Further possibilities are, for example, a supercapacitor, a fuel cell and a flywheel.

According to one or more embodiments, the power system comprises monitoring means for determining a minimum level other than zero level for the energy available from the secondary power source. In one embodiment of the method, a minimum level other than zero level for the energy available from the secondary power source is monitored. Thus, in such embodiments, there is always some energy available from the secondary power source. This can be accomplished, for example, by reducing power consumption from the secondary power source. The minimum level for the energy available from the secondary power source may be determined to correspond to energy needed to perform a rescue run, e.g. to drive an elevator car to a selected floor in occurrence of power failure of the primary power source. The selected floor may be the closest floor or for example a floor requiring least amount of energy for driving elevator car thereto, to perform the rescue run function.

According to one or more embodiments, feeding of power from the secondary power source to the motor is discontinued if the available energy is reduced to the minimum level. This means that adequate amount of energy is secured to perform the rescue run.

According to one or more embodiments, the power system is configured to feed the power used by the elevator motor during power failure of the primary power source from the secondary power source. This means that elevator car stopped between floors in power failure situation can be driven with rescue run to a floor to release passengers. In an embodiment, all the power used by the elevator motor during power failure of the primary power source is fed from the secondary power source.

In one embodiment of the power system, the secondary power source is an energy storage, such as a battery. In one embodiment of the method, an energy storage, such as a battery is used as the secondary power source.

An energy storage may be connected to the primary power source and receive its energy therefrom. For example, a battery may be charged using the electricity network. It is possible that the power storage receives the energy from a source other than the primary power source. For example, a battery may be charged by a power generator or a solar cell.

Significant part of the energy needed to run the device or devices of the vertical transportation arrangement may be stored in an energy storage. This allows reducing the fuse size of the vertical transportation arrangement below the dimensioning rules normally used, for example by 20-50%. As a result, the direct power supply from the primary power source does not necessarily need to be enough to run the whole group of equipment simultaneously by itself. It might be possible to operate the vertical transportation arrangement continuously by taking a portion of the power from the secondary power source. In an embodiment, the power demand of the vertical transportation arrangement is designed to exceed the power available from the electricity network at least occasionally during normal operation.

Between the peaks of demand, the energy storage can be continuously charged to be ready for next energy consumption peak. It is alternatively possible to charge the energy storage only when it is preferred, for example during times of lower electricity price.

The current power system further comprises a power controlling means for controlling feeding of power from the primary power source and/or the secondary power source to a motor driving the vertical transportation device. Especially the energy demand of an elevator group comprising one or more elevators can vary broadly depending on the traffic situation and on the load of the elevator cars. Therefore, the power controlling means adjust the power taken from the primary and secondary power sources according to the variable demand of the vertical transportation arrangement.

The power controlling means may be the same device or incorporated into the controller that drives the elevator. Alternatively, it may be a separate device interacting with the controller. The power controlling means may comprise, for example a power converter having power transistors such as igbt transistors, mosfet transistors, silicon carbide transistors, gallium nitride transistors; may be a frequency converter having rectifier, the input of which is connected or connectable to mains (i.e. the primary power source), inverter connected to elevator motor and DC link between the rectifier and the inverter. The secondary power source, such as battery, may be connected or connectable to the DC link or to the input of the rectifier.

Each vertical transportation device typically has its own motor. Therefore, there are typically as many motors to feed energy to as there are devices. Therefore, the controlling means may comprises an apparatus for monitoring and integrating usage information from each motor for optimizing the division of energy from the primary and secondary power sources. The apparatus may be a computer running a dedicated software.

In the current power system, it is possible that the motor receives all the energy from the primary power source. Alternatively, it is possible that, at least occasionally, all the power is received from the secondary power source. A third alternative is that some of the energy is received from the primary power source, and some of the energy from the secondary power source. However, the power controlling means is configured in a manner that allows the secondary power source to be used during normal operation of the vertical transportation arrangement.

By normal operation is herein meant the regular functioning of the vertical transportation arrangement. Situations falling outside the normal operation include, for example, emergency mode in case of a fire alarm or when a malfunction in the elevator has been detected, as well as manual driving during maintenance.

The secondary power source can additionally be used for feeding power to the motor in an emergency situation, for example when the primary power source is down. In such cases, it is possible that all the power fed to the motor is received from the secondary power source.

The proportion of the energy fed from the primary and secondary power sources, respectively, can vary according to the situation. Thus, during times of heavy use of the vertical transportation arrangement, a larger proportion of the energy is received from the secondary power source than during times of lighter traffic.

The power feeding in the vertical transportation arrangement comprising the current power system can be regulated by monitoring pre-determined parameters relating to the power sources, or by monitoring pre-determined parameters relating to the power usage of the transportation system, or by a combination of both monitoring arrangements.

For the primary power source, such pre-determined parameters may be the frequency or the available current. The means for monitoring parameters relating to the primary power source and/or the monitoring means for determining the minimum level for the energy available from the secondary power source can be arranged as a part of the power controlling means, or as separate devices.

In one embodiment of the power system, the system comprises means for monitoring pre-determined parameters relating to the primary power source for regulating the extent to which power is fed from the secondary power source to the motor. For example, the means for monitoring pre-determined parameters relating to the primary power source may comprise a current sensor fitted to measure line current; voltage sensor fitted to measure line voltage; microprocessor configured to determine line power from line current and line voltage, the microprocessor being configured to command feed of power from the secondary power source when determined line power exceeds a threshold value. In one embodiment of the method, pre-determined parameters relating to the primary power source are monitored for regulating the extent to which power is fed from the secondary power source to the motor.

It is also possible that the power available from the primary power source fluctuates so that it is enough to run the vertical transportation arrangement at some times, but sometimes the energy availability is too low. If there are indications that the available power from the primary power source is reduced, or will be reduced shortly, more energy can be taken from the secondary power source already beforehand to avoid any distortions in the functioning of the transport system.

Advantage can also be taken of so-called smart grids by the current power system. For example, the electricity network can inform the power system of times when using the primary power source is preferred, and when not. The power system can respond by changing the relative use of the primary and secondary power sources accordingly. If the power storage is charged from the primary power source, times of cheap or renewably produced energy can be utilized to charge the energy storage.

In embodiments, in which the secondary power source is an energy storage, the energy available from the power source can mean the minimum charge level of the energy storage. For example, an emergency reserve can always be maintained so that, in cases where the vertical transportation arrangement comprises one or more elevators, each elevator car can be driven to the appropriate landing solely by the energy available from the power storage of the corresponding elevator. The minimum level can vary depending on, for example, on the load in the elevator cars. Also the weight of the rope influences this, depending on the position of the elevator car in the shaft. This can be monitored through sensors in the elevator cars. The level of energy available from the secondary power source may be constantly monitored.

In one embodiment of the power system, feeding of power from the secondary power source to the motor is discontinued if the available energy is reduced to the minimum level. In another embodiment of the method, if the available energy is reduced to the minimum level, feeding of power from the secondary power source to the motor is discontinued if the available energy is reduced to the minimum level.

In some embodiments, the elevator trips are planned (beforehand) such that the available energy always remains at or above the minimum level. This can mean that group controller allocates elevator calls to different elevators such that available energy of the elevators always remains at or above a minimum level. In some embodiments one or more elevator drive parameters, such as acceleration, deceleration and/or maximum speed are selected such that the available energy always remains at or above the minimum level.

The discontinuation of power feeding from the secondary power source allows maintaining a pre-determined minimum amount of energy available for situations falling outside the normal operation of the vertical transportation arrangement. The minimum level can be determined specifically for each vertical transportation arrangement comprising the power system according to the current invention. Typically, the minimum level is a level on which the secondary power source is still enough to move the devices on the vertical transportation arrangement for some time. The discontinuing of feeding the power from the secondary power source can be overridden, in case the vertical transportation arrangement enters a safety, or an emergency mode, for example due to failure in the function of the primary power source.

In situations where feeding power from the secondary power source is discontinued, the vertical transportation arrangement can operate as done in prior art solutions, i.e. by adapting the power consumption to available levels. For example in elevator arrangements, the allocation of calls and/or the acceleration of the elevator cars may be adjusted.

For example, during night-time, or other times during which charging the energy storage is preferred, the vertical transportation devices may be driven as far as possible by the primary power source.

In one embodiment of the power system, the system comprises means for monitoring the power usage of the vertical transportation arrangement for regulating the extent to which power is fed from the secondary power source to the motor. For example, the means for monitoring the power usage of the vertical transportation arrangement may comprise a current sensor fitted to measure line current; voltage sensor fitted to measure line voltage; microprocessor configured to determine line power from line current and line voltage, the microprocessor being configured to command feed of power from the secondary power source when determined line power exceeds a threshold value. In one embodiment of the method, the power usage of the transportation system is monitored for regulating the extent to which power is fed from the secondary power source to the motor.

Instead of monitoring, the power usage may also be calculated, or measured power usage can be memorized as a function of car load.

The power usage may be monitored on-line. That is, the power usage is continuously monitored and the power feeding from the secondary power source is adjusted accordingly. Alternatively or in addition, it is possible to follow the energy consumption over time to establish peak periods of power usage. These can be taken into account when controlling the distribution of power from the primary and secondary power sources so that the secondary power source can provide sufficient power during a peak period.

It is possible to provide the power usage information to the power controlling means and to store it therein.

In many embodiments, the energy storage is charged from the primary power source, in part or completely. In another embodiment of the power system, the system comprises charging means for charging the energy storage by regenerative power from the movement of the vertical transportation arrangement. In another embodiment of the method, regenerative power from the movement of the vertical transportation arrangement is used for charging the energy storage. The regenerative power from the vertical transportation arrangement is available especially in elevator arrangements. Utilization of the regenerative power, which is available, for example when the elevator car brakes, or when an empty elevator car is moving upwards, or when a full elevator car is moving downwards, can help reduce the overall energy consumption of the vertical transportation arrangement. In the current power system, the energy storage can be charged by regenerative power and by other power sources, such as the primary power source. In embodiments, in which the vertical transportation arrangement comprises more than one vertical transportation device, the regenerative power from one device can be allocated in driving the other devices in addition to or instead of the device from which the power was generated.

Power consumption peaks are especially pronounced for fully-loaded elevator cars accelerating upwards, or for empty elevator cars accelerating downwards. Therefore, the current power system and method are especially suited for elevators, especially passenger and cargo elevators of buildings. However, advantages can be achieved in escalators, inclined moving walks or the combination of different types of vertical transportation devices. Thus, in another aspect, an elevator arrangement comprising the power system according to the current disclosure is disclosed. In one embodiment of the elevator arrangement, the elevator arrangement comprises at least two elevator cars.

In another embodiment of the elevator arrangement, the elevator arrangement comprises a controller configured to plan elevator run based on the pre-determined parameters relating to the primary power source. The controller may be a controller for an individual elevator car, or a group controller for an elevator group. In the latter case, the controller calculates the optimum routes for the elevator cars in the group, and allocates the calls accordingly.

In another aspect, an escalator system comprising the power system according to the current disclosure is disclosed. In yet another aspect, an inclined moving walk system comprising the power system according to the current disclosure is disclosed.

In yet another aspect, a vertical transportation arrangement comprising two or more types of vertical transportation devices is disclosed. Such a vertical transportation arrangement comprises at least two of the following: at least one elevator, at least one escalator, at least one inclined moving walk, and comprises the power system according to the current disclosure. Embodiments of such vertical transportation arrangements can include the combination of one elevator and one escalator, two elevators and an escalator, three or more elevators and an escalator, two elevators and two escalators, two elevators and more than two escalators, an elevator and an inclined moving walk, for example.

DESCRIPTION OF DRAWINGS

The following figures are to be understood as exemplary embodiments of the material transport arrangement according to the present disclosure. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described below may also be employed without departing from the scope of the invention, which is defined in the accompanying claims.

There are various controlling and safety devices for the power system and vertical transportation arrangements, but all of them have been omitted from the figures for clarity and any conventional methods can be used for their design. For example, conventional components such as switches, contactors, fuses and frequency converters have been omitted, as their design and use is known to the skilled person. All parts of the power system and vertical transportation arrangements are depicted only schematically and their sizes are not drawn proportionally. Further, all additional device components are omitted from the figures, although some of them might be present simultaneously with the current power system.

LIST OF FEATURES INDICATED IN THE FIGURES

1: first interface
2: primary power source
3: second interface
4: secondary power source
5: power controlling means
6: motor
7: means for monitoring pre-determined parameters relating to the primary power source
8: means for monitoring power usage of the vertical transportation arrangement
9: monitoring means for determining the minimum charge level
10: charging means
11: charging interface FIG. 1 presents an embodiment of the power system according to the current disclosure in a schematic manner. The arrowheads indicate the energy movement direction.

In the embodiment of FIG. 1, the power system comprises a first interface 1 for connecting to a primary power source 2, and a second interface 3 for connecting to a secondary power source 4. Power is fed to the motor 6 of the vertical transportation device from the primary power source 2 through the first interface 1 and from the secondary power source 4 through the second interface 3. Power controlling means 5 adjust the power fed from the primary and the secondary power sources, but both of them are used under normal operation of the vertical transportation device.

In the embodiment of FIG. 1, the secondary power source 4 is a battery, and it is charged from the same primary power source 2 which is used for feeding power to the motor 6 through the first interface 1. It is possible to configure the battery so that its charging level remains above zero at all times. A charging interface 11 is used to charge the battery. In the embodiment, regenerative power from the motor 6 can be used to charge the battery by charging means 10.

The embodiment of FIG. 1 further comprises means 8 for monitoring the power usage of the motor 6. This can be used for optimizing the allocation of power from the primary power source 2 and the secondary power source 4.

Figure 2:
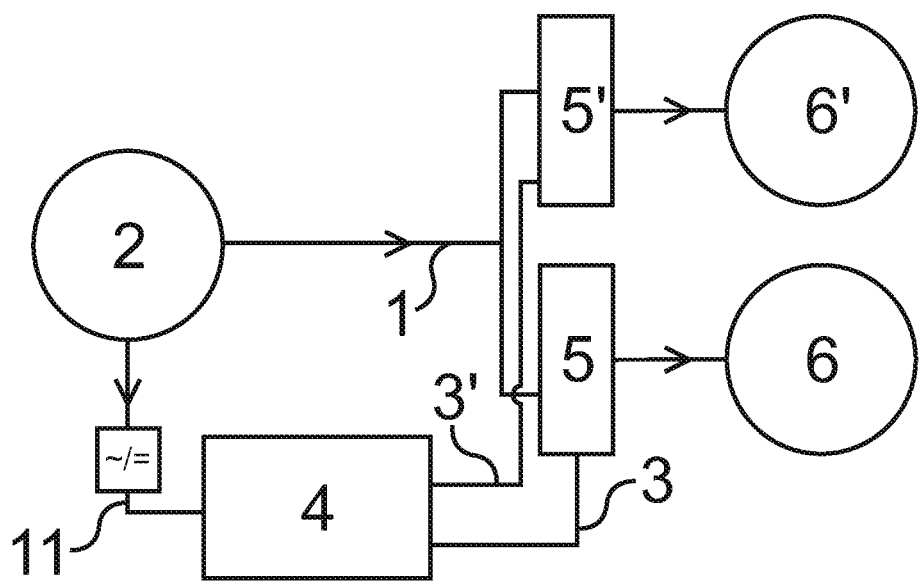
FIG. 2 presents an embodiment of the power system according to the present disclosure comprising two vertical transportation devices.

FIG. 2 presents an embodiment of the power system according to the present disclosure comprising two vertical transportation devices, each driven by its own motor 6 and 6'. The vertical transportation devices can both be elevators, for example. Alternatively, one of the vertical transportation devices may be an elevator, and the other may be an escalator. Other combinations of the types of vertical transportation devices are possible, since the power system according to the current disclosure may be used in a variety of installations with variable components.

In the embodiment of FIG. 2, the vertical transportation devices use one primary power source 2 and one secondary power source 4. However, it is possible that each vertical transportation device has its own secondary power source 4 connected to the primary power source by a charging interface 11. Each motor 6, 6' has its own power controlling means 5, 5', respectively, which is connected to the secondary power source 4 by a second interface 3, 3'.

Also in the embodiment of FIG. 2, it is possible to have means for monitoring power usage 8 and/or charging means 10, as in the embodiment of FIG. 1, adapted for a power system with two vertical transportation devices. For example, only one of the vertical transportation devices could have charging means 10. Means 8 for monitoring power usage could be used for both motors 6, 6'.

The invention claimed is:

1. A power system for feeding power into a vertical transportation arrangement, the power system comprising:
   a first interface for connecting to a primary power source;
   a second interface for connecting to a secondary power source; and
   a controller configured to,
      determine a minimum level other than a zero level for energy available from the secondary power source based on an amount of energy needed for a rescue run of the vertical transportation arrangement, and
      control feeding of power from the primary power source and the secondary power source to a motor for driving the vertical transportation arrangement such that at least some of the power used by the motor during normal operation is fed from the secondary power source while always maintaining the energy available from the secondary power source at or above the minimum level by
   (i) adjusting the minimum level for the energy available from the secondary power source level based on a load of the vertical transportation arrangement and (ii) planning trips for the vertical transportation arrangement in view of always maintaining the energy level from the secondary power source at or above the minimum level during the normal operation.

2. The power system according to claim 1, further comprising:
a monitoring device configured to monitor parameters relating to the primary power source, wherein
the controller is configured to control feeding of the power based on the parameters.

3. The power system according to claim 1, further comprising:
a monitoring device configured to monitor power usage of the vertical transportation arrangement, wherein
the controller is configured to control feeding of the power based on the power usage.

4. The power system according to claim 1, wherein the controller is configured to discontinue feeding power from the secondary power source to the motor if the energy available from the secondary power source is reduced to the minimum level.

5. The power system according to claim 1, wherein the secondary power source includes at least one battery.

6. A method of controlling a power system for feeding power into a vertical transportation arrangement, the power system including a first interface for connecting to a primary power source and a second interface for connecting to a secondary power source, the method comprising:
determining a minimum level other than a zero level for energy available from the secondary power source based on an amount of energy used for a rescue run of the vertical transportation arrangement, and
controlling feeding of power from the primary power source and the secondary power source to a motor driving the vertical transportation arrangement such that at least some of the power used by the motor during normal operation is fed from the secondary power source while always maintaining the energy available from the secondary power source at or above the minimum level by (i) adjusting the minimum level for the energy available from the secondary power source level based on a load of the vertical transportation arrangement and (ii) planning trips for the vertical transportation arrangement in view of always maintaining the energy level from the secondary power source at or above the minimum level during the normal operation.

7. The method according to claim 6, further comprising:
monitoring parameters relating to the primary power source, wherein
the controlling controls feeding of the power based on the parameters.

8. The method according to claim 6, further comprising:
monitoring power usage of the vertical transportation arrangement, wherein
the controlling controls feeding of the power based on the power usage.

9. The method according to claim 6, further comprising:
discontinuing feeding power from the secondary power source to the motor, if the energy available from the secondary power source is reduced to the minimum level.

10. The method according to claim 6, wherein the secondary power source includes at least one battery.

11. An elevator arrangement comprising:
the power system according to claim 1.

12. The elevator arrangement according to claim 11, wherein the elevator arrangement comprises:
at least two elevator cars.

13. The elevator arrangement according to claim 11, wherein the elevator arrangement comprises:
an elevator controller configured to plan elevator runs based on parameters relating to the primary power source.

14. The elevator arrangement according to claim 11, wherein the power system is configured to feed the power used by the motor during power failure of the primary power source from the secondary power source.

15. An escalator arrangement comprising:
the power system according to claim 1.

16. An inclined moving walk arrangement comprising:
the power system according to claim 1.

17. A vertical transportation arrangement comprising:
two or more of at least one elevator, at least one escalator, at least one inclined moving walk; and
the power system according to claim 1.

18. The power system of claim 1, wherein the controller is configured to determine the minimum level for the energy available from the secondary power source by determining an amount of energy used to drive an elevator car of the vertical transportation arrangement to a closest floor in relation thereto.

19. The power system of claim 18, wherein the controller is configured to,
monitor, via one or more sensors, the load of the elevator car,
determine the amount of energy used to drive the elevator car to the closest floor is based on the load of the elevator car,
adjust the minimum level of the energy available from the secondary power source level such that the secondary power source always maintains at least the amount of energy used to drive the elevator car to the closest floor, and
discontinue feeding power from the secondary power source to the motor if the energy available from the secondary power source is reduced to the adjusted minimum level.

20. The power system of claim 1, wherein the controller is configured to recharge the secondary power source using regenerative power generated by the motor.

21. The power system according to claim 2,
wherein the monitoring device is configured to monitor one or more of a frequency of the power from the primary power source or an available current of the primary power source,
wherein the controller is configured to control feeding of the power based on the one or more of the frequency of the power from the primary power source or the available current of the primary power source.

* * * * *